US012202925B2

United States Patent
Matsumoto et al.

(10) Patent No.: US 12,202,925 B2
(45) Date of Patent: Jan. 21, 2025

(54) ORGANOPOLYSILOXANE, ULTRAVIOLET-CURABLE SILICONE COMPOSITION AND CURED PRODUCT

(71) Applicant: Shin-Etsu Chemical Co., Ltd., Tokyo (JP)

(72) Inventors: Nobuaki Matsumoto, Annaka (JP); Toshiyuki Ozai, Annaka (JP); Taichi Kitagawa, Annaka (JP); Kohei Otake, Annaka (JP); Mamoru Hagiwara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 685 days.

(21) Appl. No.: 17/431,680

(22) PCT Filed: Mar. 5, 2020

(86) PCT No.: PCT/JP2020/009440
§ 371 (c)(1),
(2) Date: Aug. 17, 2021

(87) PCT Pub. No.: WO2020/189307
PCT Pub. Date: Sep. 24, 2020

(65) Prior Publication Data
US 2022/0135744 A1     May 5, 2022

(30) Foreign Application Priority Data
Mar. 19, 2019    (JP) .................................. 2019-050681

(51) Int. Cl.
| | | |
|---|---|---|
| C08G 77/20 | (2006.01) | |
| B33Y 70/00 | (2020.01) | |
| C08F 299/08 | (2006.01) | |
| C08G 77/26 | (2006.01) | |
| C08G 77/388 | (2006.01) | |
| C08K 5/08 | (2006.01) | |
| C08L 83/08 | (2006.01) | |
| C09D 183/08 | (2006.01) | |

(52) U.S. Cl.
CPC ............ *C08G 77/388* (2013.01); *B33Y 70/00* (2014.12); *C08G 77/26* (2013.01); *C08L 83/08* (2013.01); *C09D 183/08* (2013.01); *C08L 2205/02* (2013.01); *C08L 2312/00* (2013.01)

(58) Field of Classification Search
CPC ...... C08G 77/388; C08G 77/26; C08G 77/04; C08G 77/20; C08G 77/80; B33Y 70/00; B33Y 10/22; C08L 83/08; C08L 2205/02; C08L 2312/00; C08L 2312/06; C08F 290/068; C08F 299/08; C08K 5/08; C08K 5/0025; C08K 4/14; B29C 64/314
See application file for complete search history.

(56) References Cited

U.S. PATENT DOCUMENTS

| | | |
|---|---|---|
| 5,314,748 A | 5/1994 | Mazurek et al. |
| 8,592,499 B2 | 11/2013 | Araki et al. |

(Continued)

FOREIGN PATENT DOCUMENTS

| | | |
|---|---|---|
| CN | 108752936 A | 11/2018 |
| EP | 0 688 351 B1 | 8/1997 |

(Continued)

OTHER PUBLICATIONS

Hara et al., machine English translation of JP 2002-302664 (Year: 2002).*
Japanese Office Action for Japanese Application No. 2019-050681, dated Apr. 5, 2022, with English Translation.
Office Action issued Oct. 31, 2022, in Chinese Patent Application No. 202080019569.6.

(Continued)

*Primary Examiner* — Jessica M Roswell
(74) *Attorney, Agent, or Firm* — Birch, Stewart, Kolasch & Birch, LLP

(57) ABSTRACT

Provided are an excellently convenient ultraviolet-curable organopolysiloxane causing no surface curing inhibition even when cured in the atmosphere; a composition containing such organopolysiloxane; and a cured product of such composition. The organopolysiloxane is represented by the following formula (1):

$$R^1-\underset{\underset{R^1}{|}}{\overset{\overset{R^1}{|}}{Si}}-O-\left(\underset{\underset{R^1}{|}}{\overset{\overset{R^1}{|}}{Si}}-O\right)_m-\underset{\underset{R^1}{|}}{\overset{\overset{R^1}{|}}{Si}}-R^1 \quad (1)$$

wherein each $R^1$ independently represents a monovalent hydrocarbon group having 1 to 10 carbon atoms or a group represented by the following formula (2), each molecule has at least one group represented by the following formula (2), m is a number satisfying $1 \leq m \leq 10{,}000$, $$R^2\underset{\underset{H}{|}}{N}\overset{\overset{O}{\|}}{C}\underset{\underset{H}{|}}{N}R^3 \quad (2)$$

wherein $R^2$ represents a group having at least one of an acryloyl group, methacryloyl group, acryloyloxyalkyl group or methacryloyloxyalkyl group, $R^3$ represents a divalent hydrocarbon group having 1 to 20 carbon atoms.

6 Claims, No Drawings

(56) References Cited

U.S. PATENT DOCUMENTS

| | | | |
|---|---|---|---|
| 10,155,834 | B2 | 12/2018 | Humpal et al. |
| 10,544,272 | B2 | 1/2020 | Hatakeyama et al. |
| 10,822,532 | B2 | 11/2020 | Rathore et al. |
| 10,836,934 | B2 | 11/2020 | Rathore et al. |
| 10,950,364 | B2 | 3/2021 | Hatakeyama et al. |
| 11,124,680 | B2 * | 9/2021 | Otake ................. C08F 283/124 |
| 2003/0152786 | A1 * | 8/2003 | Lewis ................. C08G 77/388 428/447 |
| 2017/0275406 | A1 | 9/2017 | Matsumoto et al. |
| 2017/0335076 | A1 | 11/2017 | Hatakeyama et al. |
| 2019/0233670 | A1 | 8/2019 | Matsumoto et al. |

FOREIGN PATENT DOCUMENTS

| | | |
|---|---|---|
| EP | 0 832 936 A1 | 4/1998 |
| JP | 8-507563 A | 8/1996 |
| JP | 2002-302664 A | 10/2002 |
| JP | 2008-31307 A | 2/2008 |
| JP | 2009-288703 A | 12/2009 |
| JP | 2013-112750 A | 6/2013 |
| JP | 2016-190979 A | 11/2016 |
| JP | 2017-171734 A | 9/2017 |
| JP | 2017-202023 A | 11/2017 |
| JP | 2017-206626 A | 11/2017 |
| WO | WO 2018/003381 A1 | 1/2018 |
| WO | WO-2018225430 A1 * 12/2018 ................ C08F 2/50 |
| WO | WO 2019/064116 A1 | 4/2019 |
| WO | WO 2019/064117 A1 | 4/2019 |
| WO | WO 2019/194107 A1 | 10/2019 |
| WO | WO 2019/194108 A1 | 10/2019 |

OTHER PUBLICATIONS

Taiwanese Office Action and Search Report for Taiwanese Application No. 109107990, dated Sep. 6, 2023, with an English translation.

Extended European Search Report for European Application No. 20773923.6, dated Nov. 7, 2022.

Mazurek et al., "Novel Materials Based on Silicone-Acrylate Copolymer Networks," Journal of Applied Polymer Science, vol. 80, 2001, pp. 159-180.

Buruiana et al., "Influence of UV irradiation and two photon processing on the cinnamate monomers polymerization and formation of hybrid composites with nanosized ZnO", European Polymer Journal, 2012, vol. 48, No. 12, pp. 1976-1987.

International Search Report for PCT/JP2020/009440 (PCT/ISA/210) mailed on May 26, 2020.

Matei et al., "Two Photon Polymerization of Ormosils", AIP Conference Proceedings, 2010, vol. 1278, pp. 843-851.

Written Opinion of the International Searching Authority for PCT/JP2020/009440 (PCT/ISA/237) mailed on May 26, 2020.

* cited by examiner

ORGANOPOLYSILOXANE, ULTRAVIOLET-CURABLE SILICONE COMPOSITION AND CURED PRODUCT

TECHNICAL FIELD

The present invention relates to an organopolysiloxane; an ultraviolet-curable silicone composition containing such organopolysiloxane; and a cured product of such composition.

BACKGROUND ART

As a reaction(s) for curing a silicone composition, there have long been employed a cross-linking reaction utilizing a hydrosilylation reaction, a thermosetting reaction using a peroxide as an initiator, and a condensation cross-linking reaction using the moisture in the atmosphere. In recent years, as energy saving and reduction in the number of steps are demanded more than ever, an ultraviolet curing reaction enabling curing at room temperature in a short period of time has gained attention. As an ultraviolet curing reaction, in particular, a reaction system of an ultraviolet-curable radical polymerization reaction can be turned into that of one-component, and is also superior in storage stability if stored without being irradiated with lights (Patent documents 1 and 2). However, an existing ultraviolet-curable silicone composition(s) has a problem that when cured in the atmosphere, curing inhibition will occur due to oxygen such that a surface layer of a cured product will not cure. The existing ultraviolet-curable silicone composition(s) will not exhibit curing inhibition if ultraviolet irradiation is performed with the composition being sandwiched between transparent members; part of the composition that has protruded therefrom shall be subjected to curing inhibition due to oxygen such that the part that has protruded has to be wiped off, or cleaning has to be performed, for example. Thus, there has been strongly desired an ultraviolet-curable silicone composition capable of solving these problems.

PRIOR ART DOCUMENTS

Patent Documents

Patent document 1: JP-A-2017-171734
Patent document 2: WO2018/003381

SUMMARY OF THE INVENTION

Problems to be Solved by the Invention

Thus, it is an object of the present invention to provide an excellently convenient ultraviolet-curable organopolysiloxane causing no surface curing inhibition even when cured in the atmosphere; a composition containing such organopolysiloxane; and a cured product of such composition.

Means to Solve the Problems

The inventors of the present invention diligently conducted a series of studies to achieve the above objects, and completed the invention as follows. That is, the inventors found that there could be provided an ultraviolet-curable silicone composition superior in surface curability even in the atmosphere by employing a particular ultraviolet-curable organopolysiloxane component.

The present invention is to provide the following ultraviolet-curable organopolysiloxane, a silicone composition containing such organopolysiloxane, and a cured product of such composition.

[1]

An organopolysiloxane represented by the following formula (1):

[Chemical formula 1]

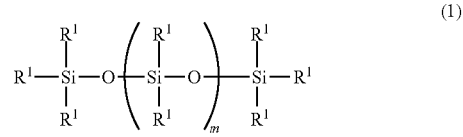

(1)

wherein each $R^1$ independently represents a monovalent hydrocarbon group having 1 to 10 carbon atoms or a group represented by the following formula (2), each molecule has at least one group represented by the following formula (2), m is a number satisfying $1 \leq m \leq 10{,}000$,

[Chemical formula 2]

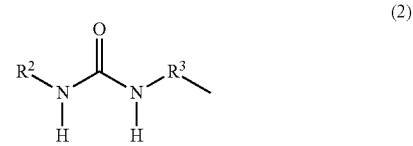

(2)

wherein $R^2$ represents a group having at least one of an acryloyl group, methacryloyl group, acryloyloxyalkyl group or methacryloyloxyalkyl group, $R^3$ represents a divalent hydrocarbon group having 1 to 20 carbon atoms.

[2]

An ultraviolet-curable silicone composition comprising:

(A) 100 parts by mass of an organopolysiloxane represented by the following formula (1):

[Chemical formula 3]

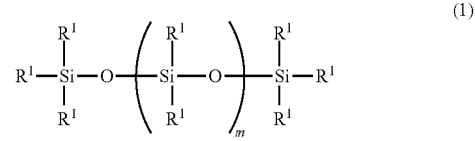

(1)

wherein each $R^1$ independently represents a monovalent aliphatic hydrocarbon group having 1 to 10 carbon atoms or a group represented by the following formula (2), each molecule has at least one group represented by the following formula (2), m is a number satisfying $1 \leq m \leq 10{,}000$,

[Chemical formula 4]

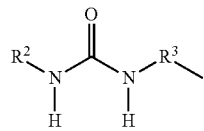

(2)

wherein R² represents a group having at least one of an acryloyl group, methacryloyl group, acryloyloxy alkyl group or methacryloyloxy alkyl group, R³ represents a divalent hydrocarbon group having 1 to 20 carbon atoms; and (B) 0.1 to 20 parts by mass of a photopolymerization initiator.

[3]

The ultraviolet-curable silicone composition according to [2], further comprising:

(C) a siloxane structure-free monofunctional (meth)acrylate compound; and/or (D) a siloxane structure-free polyfunctional (meth)acrylate compound, wherein the components (C) and/or (D) are in an amount of 1 to 500 parts by mass in terms of a total amount of the components (C) and (D) per 100 parts by mass of the component (A).

[4]

The ultraviolet-curable silicone composition according to [2] or [3], further comprising:

(E) an organopolysiloxane resin consisting of (a) an $R^4_3SiO_{1/2}$ unit (each $R^4$ independently represents a monovalent hydrocarbon group having 1 to 10 carbon atoms) and (b) an $SiO_{4/2}$ unit, wherein a molar ratio of unit (a):unit (b) is 0.4 to 1.2:1, and the component (E) is in an amount of 1 to 1,000 parts by mass per 100 parts by mass of the component (A).

[5]

The ultraviolet-curable silicone composition according to any one of [2] to [4], further comprising:

(F) a crosslinkable organopolysiloxane resin consisting of (c) a unit represented by the following formula (3), (d) the $R^4_3SiO_{1/2}$ unit (each $R^4$ independently represents a monovalent hydrocarbon group having 1 to 10 carbon atoms) and (e) the $SiO_{4/2}$ unit,

[Chemical formula 5]

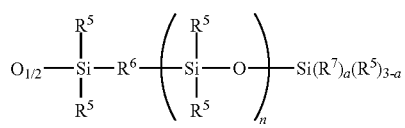

(3)

wherein each $R^5$ independently represents a monovalent hydrocarbon group having 1 to 20 carbon atoms, $R^6$ represents an oxygen atom or an alkylene group having 1 to 20 carbon atoms, each $R^7$ independently represents an acryloyloxyalkyl group, methacryloyloxyalkyl group, acryloyloxyalkyloxy group or methacryloyloxyalkyloxy group, n is a number satisfying 0≤n≤10, a is a number satisfying 1≤a≤3, and wherein a molar ratio of a sum of units (c) and (d):unit (e) is 0.4 to 1.2:1, and the component (F) is in an amount of 1 to 1,000 parts by mass per 100 parts by mass of the component (A).

[6]

A composition for a 3D printer, comprising the ultraviolet-curable silicone composition according to any one of [2] to [5].

[7]

A cured product of the ultraviolet-curable silicone composition according to any one of [2] to [5].

Effects of the Invention

The organopolysiloxane of the present invention and the ultraviolet-curable silicone composition containing the same shall not be subjected to surface curing inhibition even in the atmosphere where oxygen is present. Thus, since this ultraviolet-curable silicone composition can be cured via ultraviolet irradiation without any trouble even under the presence of oxygen, the composition is superior in productivity and workability, and is especially useful as a material for use in a 3D printer, an adhesive agent, a gluing agent and a micro-transfer printing material.

MODE FOR CARRYING OUT THE INVENTION

The present invention is described in more detail hereunder.

Organopolysiloxane

The organopolysiloxane of the present invention is an organopolysiloxane represented by the following formula (1):

[Chemical formula 6]

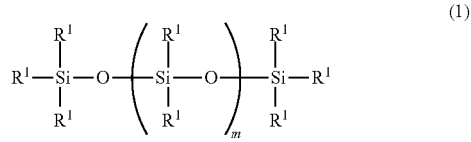

(1)

Each $R^1$ in the above formula (1) independently represents a monovalent hydrocarbon group having 1 to 10 carbon atoms or a group represented by the following formula (2). This monovalent hydrocarbon group may be either a linear, branched or cyclic group, examples of which include alkyl groups such as a methyl group, ethyl group, n-propyl group, isopropyl group, n-butyl group, isobutyl group, tert-butyl group, n-hexyl group, cyclohexyl group, n-octyl group, 2-ethylhexyl group and n-decyl group; alkenyl groups such as a vinyl group, allyl (2-propenyl) group, 1-propenyl group, isopropenyl group and butenyl group; aryl groups such as a phenyl group, tolyl group, xylyl group and naphthyl group; and aralkyl groups such as a benzyl group, phenylethyl group and phenylpropyl group.

Part of or all the hydrogen atoms bonded to the carbon atoms in these monovalent hydrocarbon groups may be substituted by a substituent group(s), specific examples of which include halogen-substituted hydrocarbon groups such as a chloromethyl group, bromoethyl group and trifluoropropyl group; and cyano-substituted hydrocarbon groups such as a cyanoethyl group.

Among these monovalent hydrocarbon groups, preferred are an alkyl group having 1 to 6 carbon atoms and an aryl group; more preferred are a methyl group, ethyl group and phenyl group.

Further, at least one of the $R^1$s in the above formula (1) is a group represented by the following formula (2).

[Chemical formula 7]

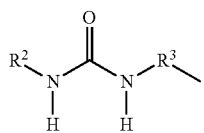

(2)

$R^2$ in the above formula (2) represents a group having at least one of an acryloyl group, methacryloyl group, acryloyloxy group or methacryloyloxy group; it is preferred that $R^2$ be a monovalent hydrocarbon group having 1 to 20 carbon atoms with at least one hydrogen atom being substituted by an acryloyl group, methacryloyl group, acryloyloxyalkyl group or methacryloyloxyalkyl group, more preferably a linear or branched alkyl group having 1 to 4 carbon atoms with at least one hydrogen atom being substituted by an acryloyl group, methacryloyl group, acryloyloxyalkyl group or methacryloyloxyalkyl group.

$R^3$ in the above formula (2) represents a divalent hydrocarbon group having 1 to 20 carbon atoms, and may be either a linear, branched or cyclic group, specific examples of which include alkylene groups such as a methylene group, ethylene group, propylene group, trimethylene group, tetramethylene group, isobutylene group, pentamethylene group, hexamethylene group, heptamethylene group, octamethylene group, nonamethylene group and decamethylene group. Among these examples, as $R^3$, preferred are a methylene group, ethylene group and trimethylene group; more preferred is a trimethylene group.

m is a number satisfying $1 \leq m \leq 10{,}000$, preferably a number satisfying $50 \leq m \leq 5{,}000$. When m is greater than 10,000, a poor workability may be observed due to an excessively high viscosity.

The value of m can, for example, be calculated as an average value by $^{29}$Si-NMR measurement or the like; or be calculated from a number average molecular weight in terms of polystyrene in a gel permeation chromatography (GPC) analysis.

Examples of such organopolysiloxane include compounds represented by the following formulae (4) to (9).

[Chemical formula 8]

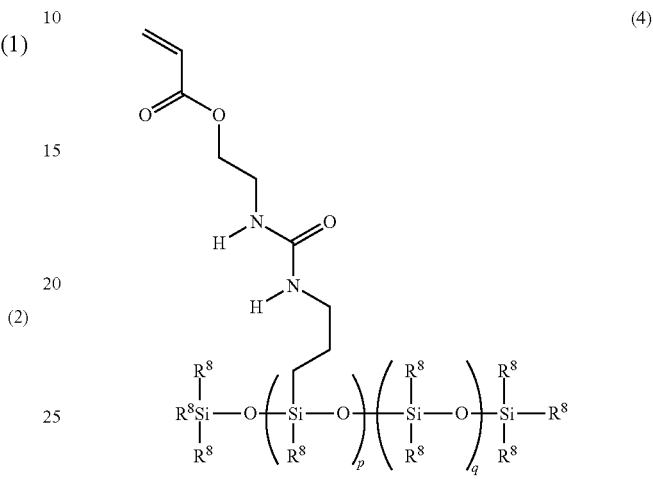

(4)

(In the formula (4), each $R^8$ independently represents a methyl group, ethyl group or phenyl group; siloxane units in the two brackets may be sequenced in any order, and may be in a block or random order. p and q are numbers satisfying $p \geq 1$, $q \geq 0$, and $1 \leq p+q \leq 10{,}000$.)

[Chemical formula 9]

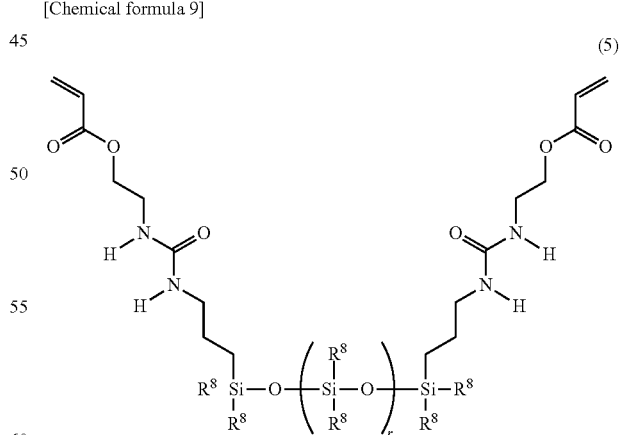

(5)

(In the formula (5), $R^8$ is defined as above; r is a number satisfying $1 \leq r \leq 10{,}000$.)

[Chemical formula 10]
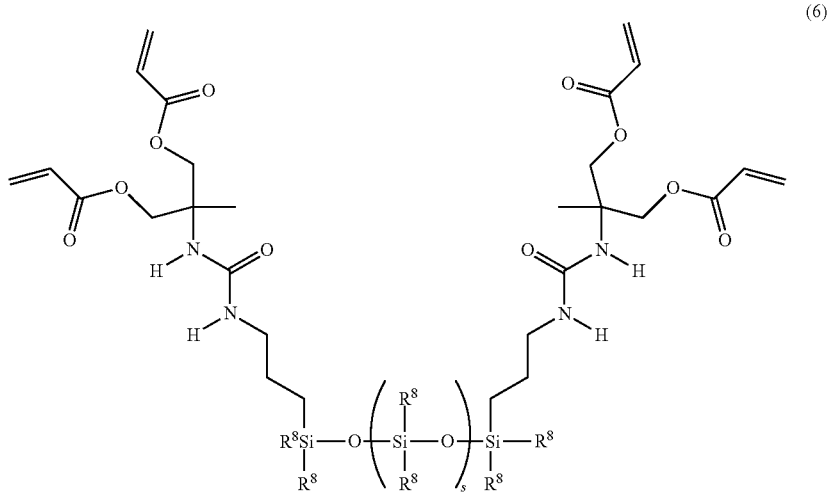
(6)
(In the formula (6), $R^8$ is defined as above; s is a number satisfying $1 \leq s \leq 10{,}000$.)
[Chemical formula 11]
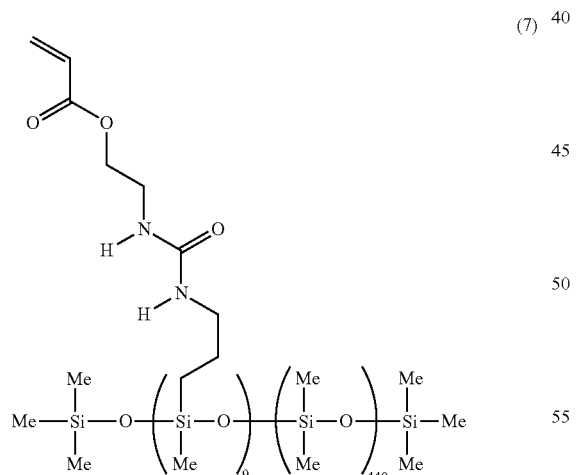
(7)
(In the formula (7), siloxane units in the two brackets may be sequenced in any order, and may be in a block or random order.)

[Chemical formula 12]

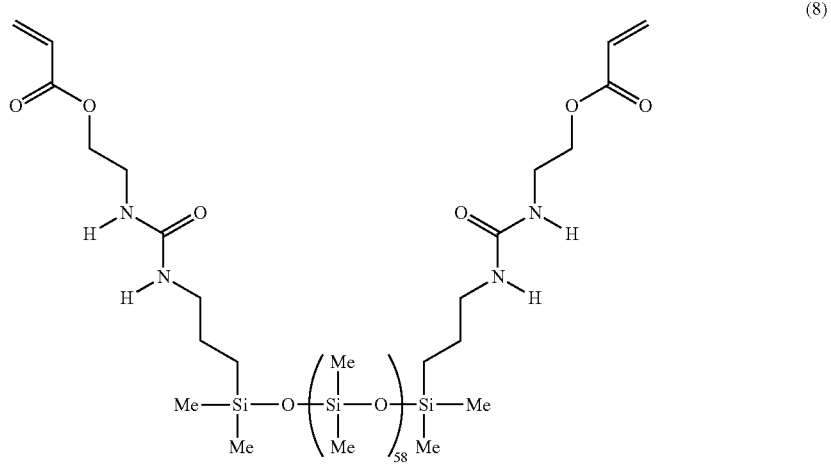

(8)

[Chemical formula 13]

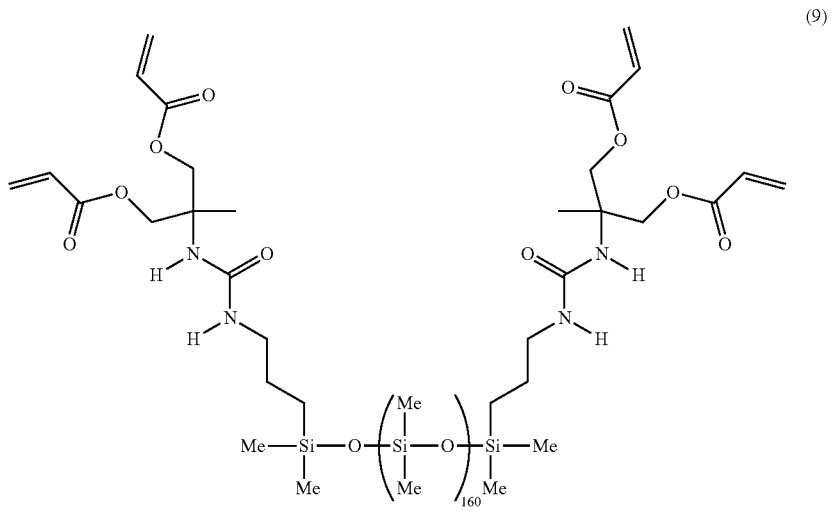

(9)

These organopolysiloxanes may, for example, be obtained by reacting amino group-containing polysiloxanes such as a side chain type amino-modified dimethyl silicone oil (KF-864 by Shin-Etsu Chemical Co., Ltd.) and a dual-end type amino-modified dimethyl silicone oil (KF-8008 by Shin-Etsu Chemical Co., Ltd.) with compounds such as 2-(acryloyloxy)ethyl isocyanate (Karenz AOI by SHOWA DENKO K.K.) and 1,1-bis(acryloyloxymethyl)ethyl isocyanate (Karenz BEI by SHOWA DENKO K.K.).

Ultraviolet-Curable Silicone Composition (A) Organopolysiloxane

A component (A) of the ultraviolet-curable silicone composition of the present invention is similar to the organopolysiloxane represented by the above formula (1).

It is preferred that the component (A) be contained in the composition of the present invention by an amount of 5 to 99.9% by mass, more preferably 20 to 99% by mass, even more preferably 30 to 99% by mass. In consideration of further improving the workability of the composition and the mechanical properties of a cured product, a viscosity of the organopolysiloxane as the component (A) at 25° C. is preferably 0.01 to 100,000 Pa·s, more preferably 0.1 to 50,000 Pa·s. Here, the viscosity can be measured by a rotary viscometer (e.g. BL type, BH type, BS type, cone-plate type, and rheometer).

(B) Photopolymerization Initiator

Examples of a photopolymerization initiator (B) include 2,2-diethoxyacetophenone, 2,2-dimethoxy-1,2-diphenylethane-1-one (Irgacure 651 by BASF Corporation), 1-hydroxy-cyclohexyl-phenyl-ketone (Irgacure 184 by BASF Corporation), 2-hydroxy-2-methyl-1-phenyl-propane-1-one (Irgacure 1173 by BASF Corporation), 2-hydroxy-1-{4-[4-(2-hydroxy-2-methyl-propionyl)-benzyl]-phenyl}-2-methyl-propane-1-one (Irgacure 127 by BASF Corporation), phenylglyoxylic acid methyl ester (Irgacure MBF by BASF Corporation), 2-methyl-1-[4-(methylthio)phenyl]-2-morpholinopropane-1-one (Irgacure 907 by BASF Corporation), 2-benzyl-2-dimethylamino-1-(4-morpholinophenyl)-1-butanone (Irgacure 369 by BASF Corporation), bis(2,4,6-trimethylbenzoyl)-phenylphosphine oxide (Irgacure 819 by BASF Corporation) and 2,4,6-trimethylbenzoyl-diphenylphosphine oxide (Irgacure TPO by BASF Corporation); and mixtures of these compounds.

Among the above components (B), preferred are 2,2-diethoxyacetophenone, 2-hydroxy-2-methyl-1-phenyl-propane-1-one (Irgacure 1173 by BASF Corporation), bis(2,4,6-trimethylbenzoyl)-phenylphosphine oxide (Irgacure 819 by BASF Corporation) and 2,4,6-trimethylbenzoyl-diphenyl-phosphine oxide (Irgacure TPO by BASF Corporation), in terms of a compatibility with the component (A).

The photopolymerization initiator is added in an amount of 0.1 to 20 parts by mass per 100 parts by mass of (A). An insufficient curability will be observed if the amount of the photopolymerization initiator added is smaller than 0.1 parts by mass; a depth curability will worsen if the photopolymerization initiator is added in an amount greater than 20 parts by mass.

In addition to the above essential components, the ultraviolet-curable silicone composition of the present invention may further contain, if necessary, a siloxane structure-free monofunctional (meth)acrylate compound and/or a siloxane structure-free polyfunctional (meth)acrylate compound as components (C) and (D).

(C) Siloxane Structure-Free Monofunctional (Meth)Acrylate Compound

Examples of the siloxane structure-free monofunctional (meth)acrylate compound (C) include isoamyl acrylate, lauryl acrylate, stearyl acrylate, ethoxy-diethylene glycol acrylate, methoxy-triethylene glycol acrylate, 2-ethylhexyl-diglycol acrylate, phenoxyethyl acrylate, phenoxydiethylene glycol acrylate, tetrahydrofurfuryl arylate and isobornyl acrylate; and mixtures of these compounds. Here, isobornyl acrylate is particularly preferred.

(D) Siloxane Structure-Free Polyfunctional (Meth)Acrylate Compound

Examples of the siloxane structure-free polyfunctional (meth)acrylate compound (D) include triethylene glycol diacrylate, polytetramethylene glycol diacrylate, neopentylglycol diacrylate, 1,6-hexanediol diacrylate, dimethyloltricyclodecane diacrylate, trimethylolpropane triacrylate and pentaerythritol tetraacrylate; and mixtures of these compounds. Here, dimethylol-tricyclodecane diacrylate is particularly preferred.

If using the (meth)acrylate compounds as the components (C) and/or (D), from the perspective of a rubber physical property of the cured product obtained, it is preferred that the components (C) and/or (D) be added in an amount of 1 to 500 parts by mass, more preferably 10 to 100 parts by mass, in terms of a total amount of the components (C) and (D) per 100 parts by mass of the component (A). Further, if combining with a component (A) having a high viscosity, the viscosity of the composition as a whole can be lowered by increasing the amount of the components (C) and/or (D) added.

Further, the ultraviolet-curable silicone composition of the present invention may further contain, if necessary, an organopolysiloxane resin as a component (E) and/or an organopolysiloxane resin as a component (F).

(E) Organopolysiloxane Resin

The component (E) is an organopolysiloxane resin consisting of (a) an $R^4{}_3SiO_{1/2}$ unit (each $R^4$ in the formula independently represents a monovalent hydrocarbon group having 1 to 10 carbon atoms) and (b) an $SiO_{4/2}$ unit, where a molar ratio between the unit (a) and the unit (b) is 0.4 to 1.2:1.

Specific examples of the monovalent hydrocarbon group having 1 to 10 carbon atoms, as represented by $R^4$, include those listed above as the examples of $R^1$, particularly those having 1 to 10 carbon atoms; even among those examples, preferred are alkyl groups having 1 to 6 carbon atoms, such as a methyl group, ethyl group, n-propyl group and n-butyl group; aryl groups having 6 to 10 carbon atoms, such as a phenyl group and tolyl group; aralkyl groups having 7 to 10 carbon atoms, such as a benzyl group; and alkenyl groups having 2 to 6 carbon atoms, such as a vinyl group, allyl group and butenyl group.

Here, even in the case of the monovalent hydrocarbon group represented by $R^4$, part of or all the hydrogen atoms bonded to the carbon atoms may be substituted by the abovementioned substituent groups.

In consideration of having an adhesive force of the composition and mechanical properties fall into a more appropriate range(s), it is preferred that with regard to the component (E), the molar ratio between (a) the $R^4{}_3SiO_{1/2}$ unit (M unit) and (b) the $SiO_{4/2}$ unit (Q unit) be M unit:Q unit=0.4 to 1.2:1, more preferably M unit:Q unit=0.6 to 1.2:1.

If using the organopolysiloxane resin as the component (E), it is preferred that the organopolysiloxane resin be added in an amount of 1 to 1,000 parts by mass, more preferably 10 to 800 parts by mass, even more preferably 20 to 500 parts by mass, per 100 parts by mass of the component (A).

There are no particular restrictions on a number average molecular weight of the component (E); it is preferred that a number average molecular weight thereof in terms of polystyrene when measured by gel permeation chromatography (GPC) be 500 to 10,000, more preferably 1,000 to 8,000, even more preferably 1,000 to 7,000.

(F) Crosslinkable Organopolysiloxane Resin

The component (F) is an organopolysiloxane resin having a (meth)acryloyloxy-containing group consisting of (c) a unit represented by the following formula (3) (referred to as $M^A$ unit hereunder), (d) the $R^4{}_3SiO_{1/2}$ unit (M unit) and (e) the $SiO_{4/2}$ unit (Q unit). Here, $R^4$ is defined as above.

[Chemical formula 14]

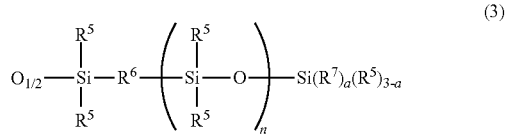

(3)

Each $R^5$ in the above formula (3) independently represents a monovalent hydrocarbon group having 1 to 20 carbon atoms. This monovalent hydrocarbon group may be either a linear, branched or cyclic group, specific examples of which include alkyl groups such as a methyl group, ethyl group, n-propyl group, isopropyl group, n-butyl group, isobutyl group, tert-butyl group, n-hexyl group, cyclohexyl group, n-octyl group, 2-ethylhexyl group and n-decyl group; alkenyl groups such as a vinyl group, allyl (2-propenyl) group, 1-propenyl group, isopropenyl group and butenyl group; aryl groups such as a phenyl group, tolyl group, xylyl group and naphthyl group; and aralkyl groups such as a benzyl group, phenylethyl group and phenylpropyl group.

Further, part of or all the hydrogen atoms bonded to the carbon atoms in these monovalent hydrocarbon groups may be substituted by a substituent group(s), specific examples of which include halogen-substituted hydrocarbon groups such as a chloromethyl group, bromoethyl group, trifluoropropyl group and cyanoethyl group; and cyano-substituted hydrocarbon groups.

Among these examples, as $R^5$, preferred are an alkyl group having 1 to 5 carbon atoms and an aryl group; more preferred are a methyl group, ethyl group and phenyl group.

$R^6$ in the above formula (3) represents an oxygen atom or an alkylene group having 1 to 20 carbon atoms. This alkylene group may be either a linear, branched or cyclic group, specific examples of which include a methylene group, ethylene group, propylene group, trimethylene group, tetramethylene group, isobutylene group, pentamethylene group, hexamethylene group, heptamethylene group, octamethylene group, nonamethylene group and decamethylene group.

Among these examples, as $R^6$, preferred are an oxygen atom, methylene group, ethylene group or trimethylene group; more preferred are an oxygen atom or ethylene group.

Each $R^7$ in the above formula (3) independently represents an acryloyloxyalkyl group, methacryloyloxyalkyl group, acryloyloxyalkyloxy group or methacryloyloxyalkyloxy group; although there are no particular restrictions on the number of the carbon atoms contained in the alkyl (alkylene) groups in these groups, a number of 1 to 10 is preferable, and a number of 1 to 5 is more preferable. Specific examples of these alkyl groups include those listed above as the examples of $R^1$, particularly those having 1 to 10 carbon atoms.

n in the above formula (3) is a number satisfying $0 \leq n \leq 10$, preferably a number of 0 or 1; a in the above formula (3) is a number satisfying $1 \leq a \leq 3$, preferably a number of 1 or 2.

In consideration of the viscosity of the composition and the mechanical properties of the cured product, it is preferred that with regard to the component (F), a molar ratio between (c) the unit represented by the above formula (3) ($M^A$ unit), (d) the $R^4{}_3SiO_{1/2}$ unit (M unit) and (e) the $SiO_{4/2}$ unit (Q unit) be ($M^A$ unit+M unit):Q unit=0.4 to 1.2:1, more preferably ($M^A$ unit+M unit):Q unit=0.6 to 1.2:1.

Further, the rubber physical property of the cured product can be adjusted by a molar ratio between the $M^A$ unit and M unit. In consideration of a strength of the cured product, it is preferred that such molar ratio be $M^A$ unit:M unit=0.01 to 1:1, more preferably $M^A$ unit:M unit=0.05 to 0.5:1.

If using the crosslinkable organopolysiloxane resin as the component (F), it is preferred that the crosslinkable organopolysiloxane resin be added in an amount of 1 to 1,000 parts by mass, more preferably 10 to 800 parts by mass, even more preferably 20 to 500 parts by mass, per 100 parts by mass of the component (A).

There are no particular restrictions on a number average molecular weight of the component (F); it is preferred that a number average molecular weight thereof in terms of polystyrene when measured by gel permeation chromatography (GPC) be 1,000 to 10,000, more preferably 2,000 to 8,000, even more preferably 2,500 to 7,000.

Other Components

Here, additives such as a color material (pigment or dye), a silane coupling agent, an adhesion aid, a polymerization inhibitor, an antioxidant, an ultraviolet absorber as a light resistance stabilizer, and a light stabilizer can be added to the composition of the present invention without impairing the effects of the present invention.

Further, the composition of the present invention may also be appropriately mixed with other resin composition(s) before use.

Production Method

The ultraviolet-curable silicone composition of the present invention can be obtained by, for example, mixing and stirring in any order the components (A) and (B) together with, if necessary, the components (C) to (F) as well as other components. There are no particular restrictions on a device (s) used for the operation of stirring or the like; there may be used, for example, a grinder, a triple roll mill, a ball mill and a planetary mixer. Further, these devices may be appropriately used in combination.

In terms of a shape retainability at the time of application and workability, it is preferred that the viscosity of the ultraviolet-curable silicone composition of the present invention be not higher than 5,000 Pa·s, more preferably not higher than 3,000 Pa·s, even more preferably not higher than 1,500 Pa·s, when measured by a rotary viscometer at 25° C.

The cured product of the ultraviolet-curable silicone composition of the present invention can be rapidly obtained via irradiation under an ultraviolet light.

In this case, as a light source of an ultraviolet light used to irradiate the composition of the present invention, there may be used, for example, a UVLED lamp, a high-pressure mercury lamp, a super high-pressure mercury lamp, a metal halide lamp, a carbon-arc lamp and a xenon lamp.

An ultraviolet irradiation dose (cumulative intensity) is preferably 1 to 10,000 mJ/cm$^2$, more preferably 10 to 8,000 mJ/cm$^2$, with respect to, for example, a sheet that is formed of the composition of the present invention and has a thickness of about 2.0 mm. That is, if using an ultraviolet light of an irradiance of 100 mW/cm$^2$, ultraviolet irradiation may simply be performed for about 0.01 to 100 sec.

Further, in order for the cured product formed of the ultraviolet-curable silicone composition of the present invention to exhibit a superior rubber physical property, it is preferred that a hardness after curing be not lower than 20 (Type A), more preferably not lower than 30 (Type A). Here, these values are measured in accordance with JIS K 6249: 2003.

The hardness after curing can be adjusted by increasing or decreasing the amounts of the components (C) and (D) added.

WORKING EXAMPLES

The present invention is described in detail hereunder with reference to working and comparative examples; the present invention is not limited to the following working examples.

Working Example 1

Here, 1,000 g of a side chain type amino-modified dimethyl silicone oil (KF-864 by Shin-Etsu Chemical Co., Ltd.) and 41.3 g of 2-(acryloyloxy)ethyl isocyanate (Karenz AOI by SHOWA DENKO K.K.) were weighed out and put into a flask, followed by performing stirring at 25° C. for 24 hours, thereby obtaining an organopolysiloxane (A-1) represented by the following average structural formula and having a viscosity of 46.3 Pa·s.

[Chemical formula 15]

(A-1)

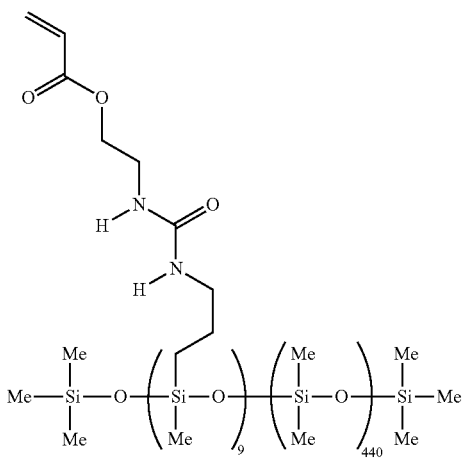

(In the formula (A-1), siloxane units in the two brackets may be sequenced in a block or random order.)

Working Example 2

Here, 1,000 g of a dual-end type amino-modified dimethyl silicone oil (KF-8008 by Shin-Etsu Chemical Co., Ltd.) and 49.4 g of 1,1-bis(acryloyloxymethyl)ethyl isocyanate (Karenz BEI by SHOWA DENKO K.K.) were weighed out and put into a flask, followed by performing stirring at 25° C. for 24 hours, thereby obtaining an organopolysiloxane (A-2) represented by the following average structural formula and having a viscosity of 13.0 Pa·s.

[Chemical formula 16]

(A-2)

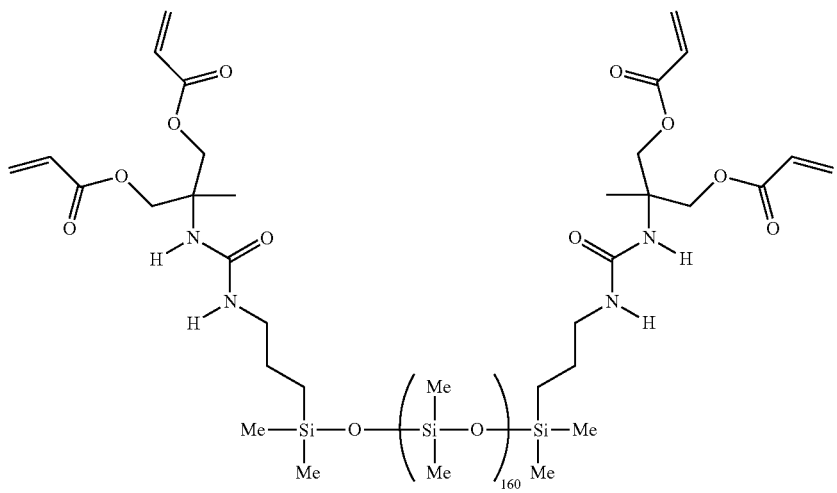

Working Example 3

Here, 1,000 g of the dual-end type amino-modified dimethyl silicone oil (KF-8008 by Shin-Etsu Chemical Co., Ltd.) and 29.1 g of 2-(acryloyloxy)ethyl isocyanate (Karenz AOI by SHOWA DENKO K.K.) were weighed out and put into a flask, followed by performing stirring at 25° C. for 24 hours, thereby obtaining an organopolysiloxane (A-3) represented by the following average structural formula and having a viscosity of 7.8 Pa·s.

[Chemical formula 17]

(A-3)

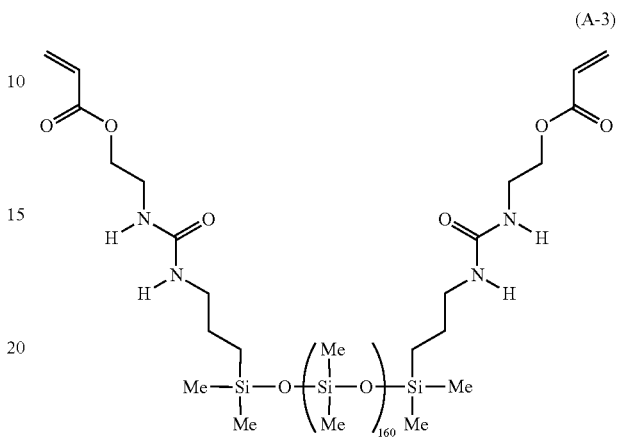

Working Examples 4 to 10; and Comparative Examples 1 and 2

Evaluations were performed on silicone compositions prepared at the compounding ratios shown in Table 1. Here, in the following examples, a viscosity refers to a value measured by a rotary viscometer at 25° C.

The hardness of the cured product was measured in accordance with JIS K 6249:2003. A surface curability was observed by finger-touch, where examples exhibiting no uncured layers were evaluated as "Completely cured," and examples exhibiting uncured layers were evaluated as "Incompletely cured."

The components (A) to (F) were mixed at the compounding ratios (parts by mass) shown in Table 1, followed by distilling away toluene at 100° C. under a reduced pressure, thereby obtaining the silicone compositions shown in Table 1.

In the atmosphere and at room temperature (25° C.), each silicone composition thus prepared was then cured via ultraviolet irradiation using an eye UV electronic control device (model UBX0601-01) manufactured by EYE GRAPHICS Co., Ltd., where the ultraviolet irradiation was performed in a way such that an irradiation dose would be 4,000 mJ/cm$^2$ at an ultraviolet wavelength of 365 nm.

Here, the compounds as the components used in the working examples 4 to 10 and comparative examples 1 and 2 are as follows.

Component (A)
- (A-1) Organopolysiloxane obtained in the working example 1
- (A-2) Organopolysiloxane obtained in the working example 2
- (A-3) Organopolysiloxane obtained in the working example 3
- (A-4) (for use in comparative example) Organopolysiloxane represented by the following average structural formula (viscosity 3.4 Pa·s)

Component (B)
- (B-1) 2-hydroxy-2-methyl-1-phenyl-propane-1-one (Irgacure 1173 by BASF Corporation)
- (B-2) 2,4,6-trimethylbenzoyl-diphenyl-phosphine oxide (Irgacure TPO by BASF Corporation)

Component (C)
- (C-1) Isobornyl acrylate (LIGHT ACRYLATE IB-XA by Kyoeisha Chemical Co., Ltd.)

Component (D)
- (D-1) Dimethylol-tricyclodecane diacrylate (LIGHT ACRYLATE DCP-A by Kyoeisha Chemical Co., Ltd.)

Component (E)
- (E-1) 60% by mass toluene solution of an organopolysiloxane resin (number average molecular weight 3,500) containing an Me$_3$SiO$_{1/2}$ unit and an SiO$_{4/2}$ unit of which a molar ratio of (Me$_3$SiO$_{1/2}$ unit)/(SiO$_{4/2}$ unit) is 0.85.

Component (F)
- (F-1) 50% by mass xylene solution of an organopolysiloxane resin (number average molecular weight 5,700) containing a methacryloyloxy group-containing unit represented by the following formula, a ViMe$_2$SiO$_{1/2}$ unit, an Me$_3$SiO$_{1/2}$ unit and an SiO$_{4/2}$ unit of which a molar ratio of methacryloyloxy group-containing unit/(ViMe$_2$SiO$_{1/2}$ unit)/(Me$_3$SiO$_{1/2}$ unit)/(SiO$_{4/2}$ unit) is 0.07/0.10/0.67/1.00.

[Chemical formula 18]

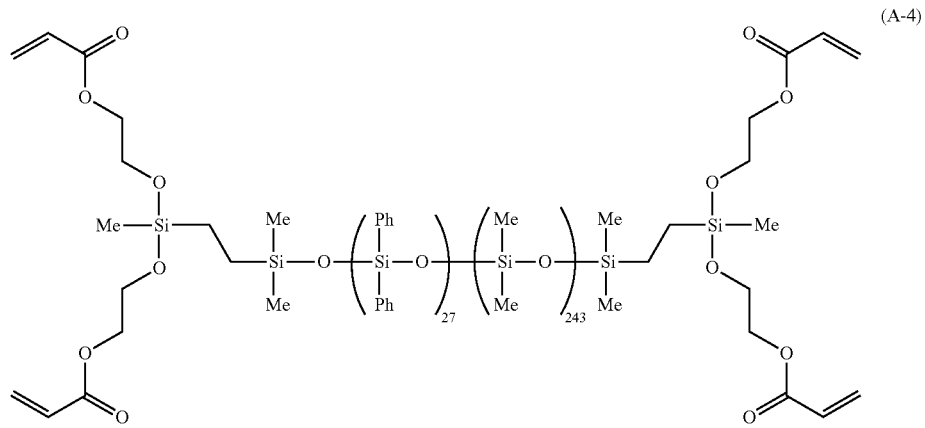

(In the formula (A-4), siloxane units in the two brackets may be sequenced in a block or random order.)

- (A-5) (for use in comparative example) Organopolysiloxane represented by the following average structural formula (viscosity 0.2 Pa·s)

[Chemical formula 19]

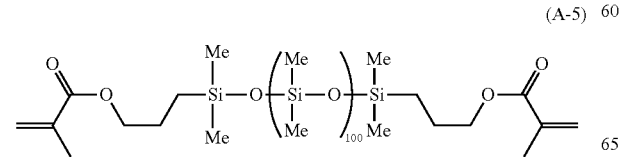

[Chemical formula 20]

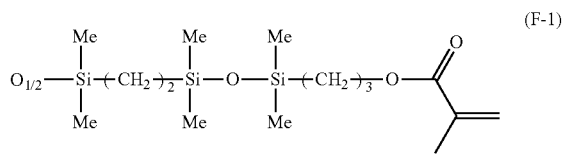

TABLE 1

|  |  | Working example | | | | | | | Comparative example | |
| --- | --- | --- | --- | --- | --- | --- | --- | --- | --- | --- |
|  |  | 4 | 5 | 6 | 7 | 8 | 9 | 10 | 1 | 2 |
| Compounding ratio (Part by mass) | A-1 | 100 | 0 | 0 | 0 | 0 | 0 | 29 | 0 | 0 |
|  | A-2 | 0 | 100 | 100 | 100 | 100 | 100 | 0 | 0 | 0 |
|  | A-3 | 0 | 0 | 0 | 0 | 0 | 0 | 71 | 0 | 0 |
|  | A-4 | 0 | 0 | 0 | 0 | 0 | 0 | 0 | 100 | 0 |
|  | A-5 | 0 | 0 | 0 | 0 | 0 | 0 | 0 | 0 | 100 |
|  | B-1 | 1 | 1 | 1 | 1 | 1 | 1 | 1.4 | 1 | 2 |
|  | B-2 | 1 | 1 | 1 | 1 | 1 | 1 | 1.4 | 1 | 0 |
|  | C-1 | 0 | 0 | 25 | 13 | 0 | 0 | 43 | 25 | 0 |
|  | D-1 | 0 | 0 | 0 | 12 | 0 | 0 | 0 | 0 | 0 |
|  | E-1 | 0 | 0 | 0 | 0 | 170 | 0 | 0 | 0 | 0 |
|  | F-1 | 0 | 0 | 0 | 0 | 0 | 200 | 0 | 0 | 0 |
| Property of composition | Viscosity (Pa·s) | 28 | 6 | 0.8 | 1.2 | 120 | 14 | 0.5 | 1.3 | 0.1 |
| Property of cured product | Hardness (TypeA) | 48 | 47 | 56 | 70 | 31 | 64 | 58 | 18 | 1 |
|  | Surface curability | Completely cured | Completely cured | Completely cured | Completely cured | Completely cured | Completely cured | Completely cured | Incompletely cured | Incompletely cured |

The ultraviolet-curable silicone composition of the present invention (working examples 4 to 10) has a favorable surface curability even when cured in the atmosphere, thus being useful as a silicone material used for modeling purposes with the aid of a 3D printer or the like. In contrast, an insufficient surface curability was observed in the comparative examples 1 and 2.

The invention claimed is:

1. An ultraviolet-curable silicone composition comprising:

(A) 100 parts by mass of an organopolysiloxane represented by the following formula (4):

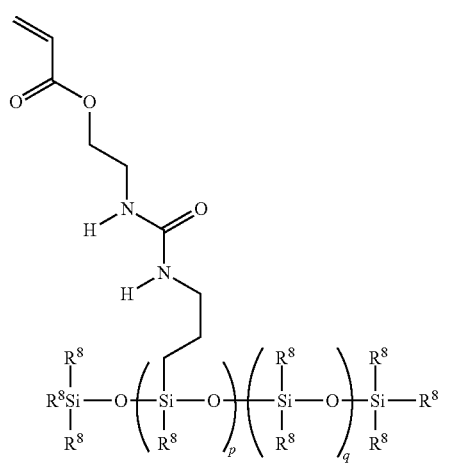

(4)

wherein each $R^8$ independently represents a methyl group, ethyl group or phenyl group; siloxane units in the two brackets may be sequenced in any order, and may be in a block or random order, p and q are numbers satisfying $p \geq 1$, $q \geq 0$, and $1 \leq p+q \leq 10{,}000$; and (B) 0.1 to 20 parts by mass of a photopolymerization initiator, wherein the content of the component (A) in the composition is 30 to 99% by mass.

2. The ultraviolet-curable silicone composition according to claim 1, further comprising:

(C) a siloxane structure-free monofunctional (meth)acrylate compound; and/or (D) a siloxane structure-free polyfunctional (meth)acrylate compound, wherein the components (C) and/or (D) are in an amount of 1 to 500 parts by mass in terms of a total amount of the components (C) and (D) per 100 parts by mass of the component (A).

3. The ultraviolet-curable silicone composition according to claim 1, further comprising:

(E) an organopolysiloxane resin consisting of (a) an $R^4{}_3SiO_{1/2}$ unit, wherein each $R^4$ independently represents a monovalent hydrocarbon group having 1 to 10 carbon atoms and (b) an $SiO_{4/2}$ unit, wherein a molar ratio of unit (a): unit (b) is 0.4 to 1.2:1, and the component (E) is in an amount of 1 to 1,000 parts by mass per 100 parts by mass of the component (A).

4. The ultraviolet-curable silicone composition according to claim 1, further comprising:

(F) a crosslinkable organopolysiloxane resin consisting of (c) a unit represented by the following formula (3), (d) the $R^4{}_3SiO_{1/2}$ unit, wherein each $R^4$ independently represents a monovalent hydrocarbon group having 1 to 10 carbon atoms and (e) the $SiO_{4/2}$ unit, $$O_{1/2}-\underset{\underset{R^5}{|}}{\overset{\overset{R^5}{|}}{Si}}-R^6\left(\underset{\underset{R^5}{|}}{\overset{\overset{R^5}{|}}{Si}}-O\right)_n Si(R^7)_a(R^5)_{3-a} \quad (3)$$

wherein each $R^5$ independently represents a monovalent hydrocarbon group having 1 to 20 carbon atoms, $R^6$ represents an oxygen atom or an alkylene group having 1 to 20 carbon atoms, each $R^7$ independently represents an acryloyloxyalkyl group, methacryloyloxyalkyl group, acryloyloxyalkyloxy group or methacryloyloxyalkyloxy group, n is a number satisfying $0 \leq n \leq 10$, a is a number satisfying $1 \leq a \leq 3$, and wherein a molar ratio of a sum of units (c) and (d): unit (e) is 0.4 to 1.2:1, and the component (F) is in an amount of 1 to 1,000 parts by mass per 100 parts by mass of the component (A).

5. A composition for a 3D printer, comprising the ultraviolet-curable silicone composition according to claim 1.

6. A cured product of the ultraviolet-curable silicone composition according to claim 1.

* * * * *